US006887811B2

(12) United States Patent
Kanbara et al.

(10) Patent No.: US 6,887,811 B2
(45) Date of Patent: May 3, 2005

(54) SPHERICAL ALUMINA PARTICLES AND PRODUCTION PROCESS THEREOF

(75) Inventors: Eiji Kanbara, Yokohama (JP); Tomiharu Yamada, Yokohama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/333,353

(22) PCT Filed: May 28, 2002

(86) PCT No.: PCT/JP02/05155

§ 371 (c)(1),
(2), (4) Date: Jul. 16, 2003

(87) PCT Pub. No.: WO02/098795

PCT Pub. Date: Dec. 12, 2002

(65) Prior Publication Data

US 2004/0009120 A1 Jan. 15, 2004

Related U.S. Application Data

(60) Provisional application No. 60/295,817, filed on Jun. 6, 2001.

(30) Foreign Application Priority Data

May 30, 2001 (JP) .......................................... 2001-163187

(51) Int. Cl.⁷ ............................. C04B 35/10; C01F 7/02
(52) U.S. Cl. ....................... 501/127; 423/625; 524/437; 501/153

(58) Field of Search ................................. 501/127, 153; 423/625; 524/438

(56) References Cited

U.S. PATENT DOCUMENTS

| | | | |
|---|---|---|---|
| 4,193,768 A | | 3/1980 | Hasegawa et al. |
| 4,308,088 A | * | 12/1981 | Cherdron et al. ............ 423/625 |
| 4,382,879 A | | 5/1983 | Funabashi et al. |
| 4,419,311 A | | 12/1983 | Claussen et al. |
| 4,952,389 A | * | 8/1990 | Szymanski et al. ......... 423/625 |
| 5,340,781 A | | 8/1994 | Oda et al. |
| 5,916,536 A | * | 6/1999 | Deville et al. .............. 423/625 |
| 6,130,279 A | * | 10/2000 | Suzuki et al. ............... 524/401 |

FOREIGN PATENT DOCUMENTS

| | | |
|---|---|---|
| EP | 0 423 490 | 4/1991 |
| EP | 0 499 585 | 8/1992 |
| EP | 0 933 397 | 8/1999 |
| JP | 05-294613 A | 11/1993 |

* cited by examiner

*Primary Examiner*—Karl Group
(74) *Attorney, Agent, or Firm*—Sughrue Mion, PLLC

(57) ABSTRACT

A process for producing roundish alumina particles includes heating at 1,000 to 1,600° C. a composition containing at least one of electrofused alumina and sintered alumina having a mean particle size greater than 35 $\mu$m, and at least one species selected from the group consisting of a halogen compound, a boron compound and an alumina hydrate; and crushing the composition.

17 Claims, No Drawings

SPHERICAL ALUMINA PARTICLES AND PRODUCTION PROCESS THEREOF

CROSS REFERENCE TO RELATED APPLICATIONS

This application is an application filed under 35 U.S.C. § 111(a) claiming the benefit pursuant to 35 U.S.C. § 119(e) (1) of the filing date of Provisional Application No. 60/295,817 filed Jun. 6, 2001 pursuant to 35 U.S.C. §111 (b).

TECHNICAL FIELD

The present invention relates to roundish alumina particles and to an industrial, economical process for producing alumina particles which are particularly useful for materials such as sealing material for electronic parts; fillers; finish lapping material; and aggregates incorporated into refractory, glass, ceramic, or composite material thereof and which cause little wear and exhibit excellent flow characteristics. The invention also relates to roundish alumina particles produced through the process and to a high-thermal-conductive rubber/plastic composition containing the alumina particles.

BACKGROUND ART

In recent years, demands for higher integration and higher density of electronic parts have elevated electric power consumption per chip. Thus, effective removal of the generated heat in order to suppress temperature elevation of electronic elements is a critical issue. In view of the foregoing, alumina, particularly corundum (α-alumina), exhibiting excellent thermal conductivity, has become a candidate filler for a heat-dissipation spacer; a substrate material on which insulating sealing materials for semiconductors and parts of semiconductor devices are mounted; etc., and modification of alumina has been effected in a variety of fields.

Among such corundum particles, JP-A HEI 5-294613 discloses non-hollow, spherical corundum particles having no fractures and a mean particle size of 35 $\mu$m or less, the particles being produced by adding aluminum hydroxide and optional, known agents serving as crystallization promoters in combination to a pulverized product of alumina such as electrofused alumina or sintered alumina, and firing the mixture.

However, the above publication provides no clear description about corundum particles, in terms of the particle size, shape, etc., produced by use of electrofused or sintered alumina having a mean particle size greater than 35 $\mu$m.

There has been also known a thermal spraying method in which alumina produced through the Bayer method is atomized into high-temperature plasma or oxygen-hydrogen flame so as to melt and quench, to thereby produce roundish particles. Although the thermal spraying method provides coarse alumina particles having a size greater than 35 $\mu$m, unit heat energy requirement is large, resulting in high costs. In addition, the thus-produced alumina, though predominantly containing α-alumina, includes by-products such as δ-alumina. Such an alumina product is not preferred, since the product fails to exhibit properties required for alumina; e.g., lower thermal conductivity.

Pulverized products of electrofused alumina or sintered alumina have been also known as corundum particles having a size greater than 35 $\mu$m. However, these corundum particles are of indefinite shape having sharp fractures and produce significant wear in a kneader, a mold, etc. during incorporation thereof into rubber/plastic. Thus, these corundum particles are not preferred from a standpoint of practical use.

Several methods for producing a rubber/plastic composition exhibiting high thermal conductivity have been known; e.g., a method in which a high-thermal-conductivity filler such as aluminum nitride, boron nitride, or silicon carbide is incorporated, and a method in which a filler is added in as large an amount as possible. However, the former method is economically disadvantageous, since incorporation of the high-thermal-conductivity filler involves considerably high costs as compared with incorporation of α-alumina. When the latter incorporation method is employed, thermal conductivity of the resultant compound (composition) can be increased by virtue of incorporation of the filler at high concentration. However, the compound exhibits poor plastic fluidity, causing difficulty in molding thereof. Thus, a limitation is imposed on the amount of filler.

There has been studied another method in which particle size distribution is widened by incorporating fillers having particle sizes falling within a variety of ranges for enhancing plastic fluidity of the compound and increasing the amount of filler. However, since self-aggregation force of a microparticle component increases with decreasing particle size, fluidity is deteriorated upon incorporation thereof into rubber/plastic, and the component forms aggregated particles in the resultant rubber/plastic composition, possibly lowering thermal conductivity. Thus, a limitation is also imposed on the particle size that allows use of microparticles. With regard to a coarse particle component, coarse particles desirably have a nearly round shape for attaining high fluidity. However, as disclosed in JP-A HEI 5-294613, particles having a mean particle size generally greater than 35 $\mu$m and no fractures are difficult to produce.

In view of the foregoing, the present inventors have carried out extensive studies, and an object of the present invention is to provide a filler made of alumina whose particles impart less grinding and polishing performance and which can be incorporated in a large amount, through improvement of a process for producing roundish corundum particles.

DISCLOSURE OF THE INVENTION

The present inventors provide a process for producing roundish alumina particles useful for solving the aforementioned problems; alumina particles produced through the process; and a high-thermal-conductivity rubber/plastic composition into which the alumina particles are incorporated.

Specifically, the present invention provides a process for producing roundish alumina particles, comprising heating at 1,000 to 1,600° C. a composition containing at least one of electrofused alumina and sintered alumina having a mean particle size greater than 35 $\mu$m, and at least one species selected from the group consisting of a halogen compound, a boron compound and an alumina hydrate; and crushing the composition.

In the process, the electrofused alumina and sintered alumina have a mean particle size of at least 50 $\mu$m.

In the process, the electrofused alumina and sintered alumina have a mean particle size greater than 35 $\mu$m and less than or equal to 120 $\mu$m.

In any one of the processes, at least one of the halogen compound and boron compound is added in an amount of 5 to 20 mass % based on an entire amount of alumina.

In any one of the processes, the halogen compound is at least one species selected from the group consisting of $AlF_3$, NaF, $CaF_2$, $MgF_2$ and $Na_3AlF_6$.

In, any one of the processes, the boron compound is at least one species selected from the group consisting of $B_2O_3$, $H_3BO_3$, $mNa_2O \cdot nB_2O_3$, wherein each of m and n is an integer, and a borofluoride compound.

In any one of the processes, the alumina hydrate is at least one species selected from the group consisting of aluminum hydroxide, alumina gel, amorphous aluminum hydroxide and a partial hydrate of aluminum compound.

In any one of the processes, each of the electrofused alumina, sintered alumina and alumina hydrate has an α-ray level of 0.01 c/cm²·hr or less.

The present invention further provides roundish alumina particles produced through any one of the production processes.

The present invention further provides a high-thermal-conductivity rubber composition containing the roundish alumina particles thus produced.

The present invention further provides a high-thermal-conductivity plastic composition containing the roundish alumina particles thus produced.

BEST MODE FOR CARRYING OUT THE INVENTION

The present invention will be described in detail.

The present invention provides a process for producing roundish alumina particles, comprising heating at 1,000 to 1,600° C. a composition at least one of containing electrofused alumina and sintered alumina having a mean particle size greater than 35 μm, and at least one species selected from the group consisting of a halogen compound, a boron compound and an alumina hydrate; and crushing the composition.

The alumina coarse particles that are employed as a starting material in the present invention may be a pulverized product of electrofused alumina or that of sintered alumina. In either case, the pulverized product is produced through any known method. The pulverized product of electrofused alumina or sintered alumina has a mean particle size greater than 35 μm, preferably 50 μm or more, more preferably greater than 35 μm and less than or equal to 120 μm, with 50 to 120 μm being particularly preferred. A mean particle size of 35 μm or less is not preferred since the mean particle size of the roundish alumina particles produced from the starting material does not exceed 35 μm.

In order to enhance roundness of coarse particles, an alumina hydrate serving as a roundness enhancer may be added in advance to electrofused alumina and/or sintered alumina in accordance with needs, followed by heating. Examples of the alumina hydrate used in the present invention include aluminum hydroxides such as gibbsite, bayerite, boehmite and diaspore; amorphous aluminum hydroxides such as alumina gel and pseudo-boehmite; and aluminum compound partial hydrates such as aluminum oxide (alumina) whose surface is partially hydrated. Of these, aluminum hydroxide, alumina gel, and alumina microparticles exhibiting high thermal reactivity are particularly preferred. From the viewpoint of economy, aluminum hydroxide (gibbsite) produced through the Bayer method is preferred, and that having a mean particle size of 10 μm or less is most preferred.

The present inventors have observed a quite surprising phenomenon that the roundness enhancer acts on coarse alumina particles synergistically with below-mentioned other agents added in accordance with needs, and selectively acts on (or is absorbed by) irregular, sharp fractures, to thereby round coarse alumina particles.

No particular limitation is imposed on the amount of the roundness enhancer, since the amount varies in accordance with the particle size distribution of a pulverized product of electrofused alumina or sintered alumina or a similar factor. For example, when aluminum hydroxide is added, the amount preferably falls within a range of 5 to 300 mass % based on electrofused alumina and/or sintered alumina, as reduced to alumina. More preferably, the amount falls within a range of 50 to 150 mass %. When the aforementioned amount is less than 5 mass %, cohering force of aggregates increases, whereas when the amount is in excess of 300 mass %, excess aluminum hydroxide is released and possibly migrates as alumina microparticles into products.

With regard to other agents that are added prior to heat treatment in accordance with needs, known compounds serving as crystal growth promoters for alumina are used singly or in combination. Preferred crystal growth promoters are halogen compounds preferably led by at least one fluorine compound selected from the group consisting of $AlF_3$, $NaF$, $CaF_2$, $Na_3AlF_6$ and $MgF_2$, and/or at least one boron compound selected from the group consisting of $B_2O_3$, $H_3BO_3$, $mNa_2O \cdot nB_2O_3$, wherein each of m and n is an integer, and a borofluoride compound. Of these, a combination of the fluorine compound and the boron compound, and the borofluoride compound are particularly preferred.

When the particle size of electrofused alumina or sintered alumina increases, reduction of fractures decreases. When the amounts of the other agents added in addition to the aforementioned alumina hydrate are increased, reduction of fractures is further promoted. Thus, even though coarse electrofused alumina/sintered alumina having a mean particle size greater than 35 μm, which hitherto has not been employed, is used as starting material, there can be produced coarse, roundish alumina particles which cause substantially no problematic wear of a kneader during incorporation thereof into rubber/plastic or a mold during molding.

Although the amount of agents to be added varies in accordance with the particle size of employed sintered alumina/electrofused alumina, heating temperature, residence time in a furnace and the type of heating furnace, the effective concentration of added agents is preferably 3 mass % or more based on the total alumina components, particularly preferably 5 mass % or more. In addition, the concentration is preferably 20 mass % or less. When the amount of added agents is less than 3 mass %, the effect of fracture reduction is insufficient, thereby increasing wear of a kneader during incorporation thereof into rubber/plastic or a mold during. molding, whereas addition in an amount greater than 20 mass % is not preferred from the viewpoint of economy.

The type of the heating furnace is not limited, and known means such as a single kiln, a tunnel kiln and a rotary kiln may be employed. No particular limitation is imposed on the heating temperature so long as the temperature assures formation of α-alumina as a final product. The heating temperature is typically 1,000° C. or higher, preferably 1,300° C. to 1,600° C. inclusive, more preferably 1,300° C. to 1,500° C. inclusive. When the temperature is elevated to 1,600° C. or higher, cohering force of aggregates increases even in the presence of aluminum hydroxide, thereby inhibiting crushing to primary particles. The required residence time in the heating furnace, which varies in accordance with the heating temperature, is 30 minutes or longer, preferably approximately one hour to three hours.

The coarse alumina particles produced through the aforementioned method tend to assume secondary aggregated particles. Thus, the particles are crushed for a short period of time by means of a known pulverization means such as a ball mill, a vibrating mill or a jet mill to thereby yield roundish corundum particles having a target particle size distribution.

In the aforementioned production method, roundish alumina particles having a low α-ray level can be produced from materials such as electrofused alumina; sintered alumina and aluminum hydroxide, all containing trace amounts of radioactive elements such as uranium and thoria. Such roundish alumina particles having a low α-ray level (0.01 c/cm$^2$·hr) are particularly useful for preventing operation failure of memory devices (i.e., software error) caused by α-rays when the particles are used as a filler of a resin sealing material for high-integration ICs, LSIs and VLSIs.

The roundish alumina produced according to the present invention assumes the form of coarse corundum particles that, although some fractures remain, provide no problematic wear of a kneader during incorporation thereof into rubber/plastic or a mold during molding and impart favorable fluidization characteristics when used in combination with a microparticle component.

The roundish alumina particles produced according to the process of the present invention are preferably incorporated into rubber or plastic to thereby provide a high-thermal-conductivity rubber composition and a high-thermal-conductivity plastic composition. Particularly, the content is preferably 80 mass % or more.

In the present invention, no particular limitation is imposed on the type of plastic (resin) which constitutes the aforementioned high-thermal-conductivity plastic composition, and any known resins can be employed. Examples thereof include unsaturated polyester resins, acrylic resins, vinyl ester resins, epoxy resins, xylene-formaldehyde resins, guanamine resins, diaryl phthalate resins, phenolic resins, furan resins, polyimide resins, melamine resins and urea resins. Of these examples, unsaturated polyester resins, acrylic resins, vinyl ester resins and epoxy resins are preferable.

In the present invention, no particular limitation is imposed on the type of rubber material (e.g., rubber component) that constitutes the aforementioned high-thermal-conductivity rubber composition, and any known rubber materials can be employed.

The present invention will be described in more detail by way of examples, which should not be construed as limiting the invention thereto.

EXAMPLE 1

Added to and mixed with 500 g of a commercially available pulverized product of sintered alumina (product of Alcoa Kasei Ltd.) having a mean particle size of 51 μm were 250 g of aluminum hydroxide (product of Showa Denko K.K.) having a mean particle size of 1 μm, 35 g of reagent grade aluminum fluoride anhydrate and 35 g of reagent grade boric acid, and the resultant mixture was placed in a heat-resistant container made of alumina ceramic. The mixture was heated at 1,500° C. for four hours in a Kanthal electric furnace, and the heated product was crushed by means of a vibrating ball mill [100 g of fired product and 1,000 g of HD alumina balls (10 mmφ) placed in a pulverizer (model SM0.6, product of Kawasaki Heavy Industries, Ltd.)] for 30 minutes. The particle size distribution of the thus-crushed product was obtained through a laser diffraction method (microtrack)

EXAMPLE 2

The procedure of Example 1 was repeated, except that the amount of added aluminum fluoride anhydrate and that of boric acid were altered to 10 g, respectively.

EXAMPLE 3

The procedure of Example 1 was repeated, except that a pulverized product of sintered alumina having a mean particle size of 90 μm was used.

COMPARATIVE EXAMPLE 1

A commercially available pulverized product of sintered alumina (product of Alcoa Kasei Ltd.) having a mean particle size of 51 μm was placed in an amount of 500 g in a heat-resistant container made of alumina ceramic and heated at 1,450° C. for four hours in a Kanthal electric furnace. The heated product was crushed by means of a vibrating ball mill (100 g of a fired product and 1,000 g of HD alumina balls (10 mmφ) placed in a pulverizer (model SM0.6, product of Kawasaki Heavy Industries, Ltd.)) for 30 minutes. The particle size distribution of the thus-crushed product was obtained through a laser diffraction method (microtrack).

Table 1 below shows the particle size distribution and particle morphology of the powder produced in each of Examples 1 to 3 and Comparative Example 1.

TABLE 1

|  | Example 1 | Example 2 | Example 3 | Comp. Ex. 1 |
|---|---|---|---|---|
| Mean particle size | 58 μm | 60 μm | 93 μm | 52 μm |
| Particle morphology | Roundish particles | Roundish particles | Roundish particles | Amorphous particles with sharp fracture |

In order to evaluate the wear property of the particles during kneading with resin or a similar material, materials of the formulation shown in Table 2 below were kneaded for three minutes by means of two rolls whose temperature was predetermined at 105° C. to 115° C. Staining of the above-formulated material caused by wear-out of hard chromium plating provided on each roll surface was visually observed, and the degree of staining was rated by reference to indices.

TABLE 2

|  | Materials | Parts by mass |
|---|---|---|
| Epoxy resin | Sumiepoxy ESCN-220F (product of Sumitomo Chemical Co., Ltd., softening point: 77.6° C.) | 100 |
| Phenolic resin | Sumilite Resin PR-51688 (product of Sumitomo Durez. Co., Ltd., softening point: 98° C.) | 50 |
| Hardening accelerator | Imidazole C-17Z (product of Shikoku Chemicals Corp.) | 1 |
| Carnauba wax | Product of Toagosei Co., Ltd. | 3 |
| Alumina |  | 850 |

Specifically, the degree of migration of removed flakes (black) of hard chromium plating generated due to wear between alumina and roll surfaces into each formulated product (white) was visually evaluated. The degree of wear was categorized into 1) no stain, 2) faint stain, 3) slight stain, 4) considerable stain and 5) complete stain. The results are shown in Table 3 below.

TABLE 3

|  | Example 1 | Example 2 | Comp. Ex. 1 |
|---|---|---|---|
| Wear degree evaluation | 2) | 3) | 5) |

EXAMPLE 4

There were mixed for one hour 80 mass % of the roundish alumina particles produced in Example 1 and 20 mass % of commercially available low-soda alumina produced through the Bayer method (product of Showa Denko K. K.) having a mean particle size of 1.7 µm by means of a rocking blender.

COMPARATIVE EXAMPLE 2

Added to 500 g of a commercially available pulverized product of sintered alumina (product of Alcoa Kasei Ltd.) having a mean particle size of 13 µm and a maximum particle size of 48 µm were 250 g of aluminum hydroxide (product of Showa Denko K. K.) having a mean particle size of 1 µm, 25 g of reagent grade aluminum fluoride anhydrate and 25 g of reagent grade boric acid, and the resultant mixture was placed in a heat-resistant container made of alumina ceramic. The mixture was heated at 1,450° C. for four hours in a Kanthal electric furnace, and the heated product was crushed by means of a vibrating ball mill (100 g of a fired product and 1,000 g of HD alumina balls (10 mmφ) placed in a pulverizer (model SM0.6, product of Kawasaki Heavy Industries, Ltd.)) for 30 minutes. The particle size distribution of the thus-crushed product was obtained through a laser diffraction method (microtrack). The produced alumina was found to assume roundish particles and have a mean particle size of 18 µm.

COMPARATIVE EXAMPLE 3

There were mixed for one hour 80 mass % of the roundish alumina particles produced in Comparative Example 2 and 20 mass % of commercially available low-soda alumina produced through the Bayer method (product of Showa Denko K. K.) having a mean particle size of 1.7 µm by means of a rocking blender.
(Evaluation of Incorporation Property)

Into 100 parts by mass of silicone oil (KF 96, 1,000 cP (centipoises), product of Shin-Etsu Chemical Co., Ltd.), one of the alumina products obtained in Examples 1 and 4 and Comparative Examples 2 and 3 was incorporated in an amount of 500 parts by mass for one measurement and in an amount of 700 parts by mass for the other measurement. The viscosity at 25° C. of each of the thus-prepared compositions was measured by use of a B-type viscometer. The results are shown in Table 4 below.

The roundish alumina particles obtained in Example 1 were identified to be coarse corundum particles that impart favorable fluidization characteristics as shown in Example 4 using the combination with the microparticle component.

TABLE 4

|  | Example 1 | Example 4 | Comp. Ex. 2 | Comp. Ex. 3 |
|---|---|---|---|---|
| Viscosity (P) | | | | |
| 500 parts by mass | 600 | 300 | 1,500 | 400 |
| 700 parts by mass | Kneading impossible | 600 | Kneading impossible | 1,800 |

EXAMPLE 5

Ingots prepared through electrofusion of commercial low-α-ray alumina (product of Showa Denko K. K.) having an α-ray level of 0.01 c/cm²·hr or lower were crushed, pulverized and classified under conditions which allowed no contamination with radioactive elements to thereby yield electrofused alumina coarse particles having a mean particle size of 60 µm and an (α-ray level of 0.005 c/cm²·hr. The alumina particles was added in an amount of 500 g to 250 g of low-α-ray aluminum hydroxide obtained through a known method (product of Showa Denko K. K.) having an α-ray level of 0.005 c/cm²·hr and a mean particle size of 5 µm, and the resultant mixture was fired and crushed in a manner similar to that of Example 1 to thereby yield roundish alumina particles having an α-ray level of 0.004 c/cm²·hr and a mean particle size of 67 µm.

INDUSTRIAL APPLICABILITY

As described hereinabove, the corundum particles produced through the process of the present invention are roundish, coarse particles that provide substantially no problematic wear of machines and apparatus. When the particles are mixed with a microparticle component to thereby widen the particle size distribution, there can be produced a resin composition containing a large amount of filler, which has never been produced due to poor fluidity.

What is claimed is:

1. A process for producing roundish alumina particles, comprising:

heating at 1,000 to 1,6000 °C. a composition containing at least one of electrofused alumina and sintered alumina having a mean particle size greater than 35 µm, an alumina hydrate and at least one species selected from the group consisting of a halogen compound and a boron compound; and crushing the composition;

wherein the alumina hydrate is added in an amount of 50 to 300 mass % based on said at least one of electrofused alumina and sintered alumina as reduced to alumina.

2. The process according to claim 1, wherein the electrofused alumina and sintered alumina have a mean particle size of at least 50 µm.

3. The process according to claim 1, wherein the electrofused alumina and sintered alumina have a mean particle size greater than 35 µm and less than or equal to 120 µm.

4. The process according to any one of claims 1 to 3, wherein at least one of the halogen compound and the boron compound is added in an amount of 5 to 20 mass% based on an entire amount of alumina.

5. The process according to claim 1, wherein the halogen compound is at least one species selected from the group consisting of $AlF_3$, $NaF$, $CaF_2$, $MgF_2$ and $Na_3AlF_6$.

6. The process according to claim 1 wherein the boron compound is at least one species selected from the group consisting of $B_2O_3$, $H_3BO_3$, $mNa_2O \cdot nB_2O_3$, wherein each of m and n is an integer, and a borofluoride compound.

7. The process according to claim 1, wherein the alumina hydrate is at least one species selected from the group consisting of aluminum hydroxide, alumina gel, amorphous aluminum hydroxide and a partial hydrate of aluminum compound.

8. The process according to claim 1, wherein each of the electrofused alumina, sintered alumina and alumina hydrate has an x-ray level of 0.01 c/cm²·hr or less.-

9. Roundish alumina particles produced through the process according to claim 1.

10. A high-thermal-conductivity rubber composition containing the roundish alumina particles according to claim 9.

11. A high-thermal-conductivity plastic composition containing the roundish alumina particles according to claim 9.

12. A sealing material for electronic parts comprising the roundish alumina particles according to claim 9.

13. The sealing material according to claim 12, wherein the electronic parts are high-integration Ics, LSIs or VLSIs.

14. A finish lapping material comprising the roundish alumina particles according to claim 9.

15. Aggregates incorporated into refractory, comprising the roundish alumina particles according to claim 9.

16. Glass comprising the roundish alumina particles according to claim 9.

17. Ceramic comprising the roundish alumina particles according to claim 9.

* * * * *